US007809928B1

(12) United States Patent
Allen et al.

(10) Patent No.: US 7,809,928 B1
(45) Date of Patent: Oct. 5, 2010

(54) GENERATING EVENT SIGNALS FOR PERFORMANCE REGISTER CONTROL USING NON-OPERATIVE INSTRUCTIONS

(75) Inventors: Roger L. Allen, Lake Oswego, OR (US); Brett W. Coon, San Jose, CA (US); Ian A. Buck, San Jose, CA (US); John R. Nickolls, Los Altos, CA (US)

(73) Assignee: NVIDIA Corporation, Santa Clara, CA (US)

(*) Notice: Subject to any disclaimer, the term of this patent is extended or adjusted under 35 U.S.C. 154(b) by 6 days.

(21) Appl. No.: 11/313,872

(22) Filed: Dec. 20, 2005

Related U.S. Application Data

(63) Continuation-in-part of application No. 11/290,764, filed on Nov. 29, 2005.

(51) Int. Cl.
G06F 9/30 (2006.01)
G06F 17/00 (2006.01)
G09G 5/02 (2006.01)

(52) U.S. Cl. .................. 712/208; 345/418; 345/589
(58) Field of Classification Search .................. 712/208
See application file for complete search history.

(56) References Cited

U.S. PATENT DOCUMENTS

| 3,952,304 | A | * | 4/1976 | Broniwitz et al. ............. 342/95 |
| 5,428,749 | A | * | 6/1995 | Rouse et al. ................ 710/105 |
| 5,537,541 | A | | 7/1996 | Wibecan |
| 5,546,037 | A | * | 8/1996 | Kenny et al. ................ 327/230 |
| 5,675,729 | A | | 10/1997 | Mehring |
| 5,796,637 | A | | 8/1998 | Glew et al. |
| 5,805,850 | A | * | 9/1998 | Luick ......................... 712/215 |
| 5,825,674 | A | * | 10/1998 | Jackson ...................... 713/321 |
| 5,835,702 | A | | 11/1998 | Levine et al. |
| 5,881,223 | A | | 3/1999 | Agrawal et al. |
| 6,006,321 | A | * | 12/1999 | Abbott ......................... 712/43 |
| 6,023,759 | A | * | 2/2000 | Omtzigt ...................... 712/227 |
| 6,067,643 | A | * | 5/2000 | Omtzigt ...................... 714/47 |
| 6,112,318 | A | * | 8/2000 | Jouppi et al. ................. 714/47 |
| 6,356,615 | B1 | * | 3/2002 | Coon et al. ................... 377/16 |
| 6,374,367 | B1 | | 4/2002 | Dean et al. |

(Continued)

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

*Primary Examiner*—Eddie P Chan
*Assistant Examiner*—William B Partridge
(74) *Attorney, Agent, or Firm*—Patterson & Sheridan, LLP

(57) ABSTRACT

One embodiment of an instruction decoder includes an instruction parser configured to process a first non-operative instruction and to generate a first event signal corresponding to the first non-operative instruction, and a first event multiplexer configured to receive the first event signal from the instruction parser, to select the first event signal from one or more event signals and to transmit the first event signal to an event logic block. The instruction decoder may be implemented in a multithreaded processing unit, such as a shader unit, and the occurrences of the first event signal may be tracked when one or more threads are executed within the processing unit. The resulting event signal count may provide a designer with a better understanding of the behavior of a program, such as a shader program, executed within the processing unit, thereby facilitating overall processing unit and program design.

18 Claims, 6 Drawing Sheets

U.S. PATENT DOCUMENTS

| | | |
|---|---|---|
| 6,775,640 B1 | 8/2004 | Swanson et al. |
| 2002/0073255 A1 | 6/2002 | Davidson et al. |
| 2002/0124237 A1 | 9/2002 | Sprunt et al. |
| 2003/0126487 A1 * | 7/2003 | Soerensen et al. .......... 713/322 |
| 2004/0006724 A1 | 1/2004 | Lakshmanamurthy et al. |
| 2005/0122334 A1 | 6/2005 | Boyd et al. |
| 2005/0188276 A1 | 8/2005 | Hunter et al. |
| 2006/0152509 A1 | 7/2006 | Heirich |
| 2007/0093986 A1 | 4/2007 | Armstead et al. |

* cited by examiner

GENERATING EVENT SIGNALS FOR PERFORMANCE REGISTER CONTROL USING NON-OPERATIVE INSTRUCTIONS

CROSS-REFERENCE TO RELATED APPLICATIONS

This application is continuation-in-part of the U.S. nonprovisional patent application titled, "Shader Performance Registers," filed Nov. 29, 2005 and having application Ser. No. 11/290,764. The subject matter of this related nonprovisional patent application is hereby incorporated by reference.

BACKGROUND OF THE INVENTION

1. Field of the Invention

Embodiments of the present invention relate generally to computer graphics and more specifically to observing shader performance using registers to track event occurrences.

2. Description of the Related Art

A shader engine is a hardware unit within a graphics processing unit (GPU) responsible for the execution of shader programs. Some types of shader engines provide shading functionality that produces "shaded" pixel data. Other types of shader engines process vertex and geometry data, as opposed to pixel data. The output of these shader engines is generally written to a GPU memory. As GPU designs advance and become more complex, the design of the shader engine also becomes more complex. A shader engine is commonly comprised of two or more individual shader units configured to function in parallel, thereby increasing the throughput of data processed by the shader engine. Furthermore, each shader unit may allow the execution of multiple instances of a shader program (also known as threads) to increase the parallel processing capability of the shader engine. This complex and parallel shader architecture enables relatively large amounts of data to be efficiently processed.

Typical shader unit architectures may include functional blocks (also referred to herein as "functional units") such as a program controller, instruction cache, address generator and one or more execution pipes. Each functional block may, in turn, have many complex processing stages as well. In operation, the various instructions making up the different threads executing within the shader unit are fetched one-by-one by the program controller. These instructions are decoded, and then the data associated with each of the threads are processed in the execution pipes in accordance with the decoded instructions.

One drawback to this type of shader architecture is that performance optimization of a given shader unit design or a shader program is difficult. First, as previously mentioned, the shader unit contains many functional blocks, each of which may be configured in multiple ways. For example, there may be several ways to configure a given functional block that provide substantially the same functionality; however, each configuration may have a different data throughput rate. Since there are so many different configurations for the overall shader unit, determining the optimal configuration for the unit (e.g., the configuration that provides the highest pixel throughput) is quite difficult and requires a shader designer to characterize and compare the performance of the many different shader unit configurations during the design process. Second, although the pixel throughput of a given shader unit configuration can be measured, there is no straight-forward way to observe what happens within the different functional blocks of a shader unit when one or more threads are executed within the shader unit. This task is made more difficult by the fact that each thread that is executed within the shader unit may represent different shader programs or even different types of shader programs. Thus, acquiring the information necessary to evaluate the performance of any particular shader unit or shader program configuration is also quite difficult.

As the foregoing illustrates, what is needed in the art is an improved means for observing performance within a shader unit to facilitate shader unit and shader program design.

SUMMARY OF THE INVENTION

One embodiment of the invention sets forth an instruction decoder configured to generate event signals based on non-operative instructions. The instruction decoder includes an instruction parser configured to process a first non-operative instruction and to generate a first event signal corresponding to the first non-operative instruction, and a first event multiplexer configured to receive the first event signal from the instruction parser, to select the first event signal from one or more event signals and to transmit the first event signal to an event logic block.

One advantage of the disclosed instruction decoder is that it may be implemented in a multithreaded processing unit, such as a shader unit, and the occurrences of the first event signal may be tracked when one or more threads are executed within the processing unit. The resulting event signal count may provide a designer with a better understanding of the behavior of a program, such as a shader program, executed within the processing unit, thereby facilitating overall processing unit and program design.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One embodiment of the present invention employs a plurality of performance registers to count event signals occurring within functional units of a shader unit. The event signals are associated with events of interest within a given functional unit. Examples of some events of interest within a program controller functional unit are instruction fetches, conditional branch instructions, call-return instructions, and the like. There may be a relatively large number of events within any one functional unit, and, as previously described herein, there may be several functional units within a shader unit. As described in greater detail below, a function generator is used to generate a function based on one or more events. Each such function, when generated, causes one of the performance registers to increment. Thus, by accessing the contents of the performance registers, a user may observe and characterize the behavior of the different functional units within the shader unit when one or more threads are executed within the shader unit.

Figure 1:
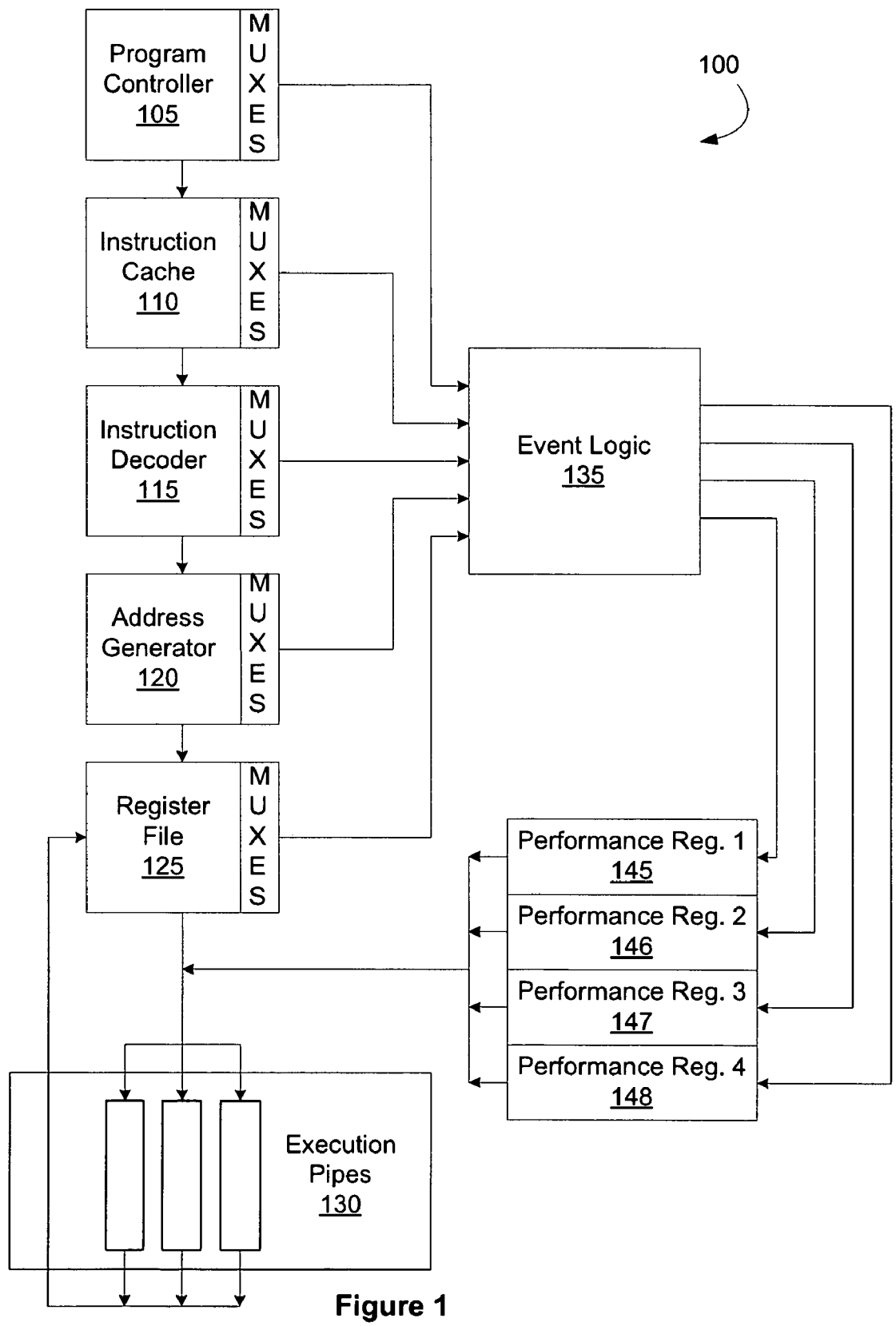
FIG. 1 is a conceptual diagram of a shader unit, according to one embodiment of the invention.

FIG. 1 is a conceptual diagram of a shader unit 100, according to one embodiment of the invention. As previously described herein, a shader engine is commonly comprised of two or more individual shader units, similar to the shader unit 100, configured to function in parallel to increase the throughput of data. As shown, the shader unit 100 includes, without limitation, a program controller 105, an instruction cache 110, an instruction decoder 115, an address generator 120, a register file 125, execution pipes 130, an event logic block 135 and four performance registers 145, 146, 147 and 148. Other embodiments may include more or less than four performance registers.

The program controller 105, instruction cache 110, instruction decoder 115, address generator 120, register file 125 and execution pipes 130 are exemplary functional units within the shader unit 100. Other embodiments of the shader unit 100 may include more or less than six functional units and may include other types of functional units in addition to or in lieu of the six functional units described herein. The functional units enable the shader unit 100 to provide shader functionality by decoding shader program instructions in the program controller 105, the instruction cache 110 and the instruction decoder 115, and processing data corresponding to the threads executing within the shader unit 100 using the address generator 120, the register file 125 and execution pipes 130.

Since the functional units provide shader functionality, the shader designer may optimize the overall design of the shader unit 100 by monitoring and evaluating process steps within one or more functional units within the shader unit 100 and using this information to implement appropriate design changes to the shader unit 100. Each functional unit may have one or more process steps that the shader designer may want to monitor and evaluate. These process steps are referred to herein as "events," and each such event has an associated "event signal."

Within a given functional unit, there may be a relatively large number of events that can be monitored and evaluated. As described in greater detail herein, one embodiment of the present invention allows up to four such events within a specific functional unit to be monitored and evaluated. As shown in FIG. 1, each functional unit 105, 110, 115, 120 and 125 has a corresponding multiplexer (mux) that is configured to select the event signals associated with the events within the functional unit that the shader designer wants to monitor and evaluate. The event signals from each functional unit 105, 110, 115, 120 and 125 are transmitted to the event logic block 135.

The event logic block 135 enables the shader designer to have greater level of control over the event signals and actual information being collected by the performance registers 145, 146, 147 and 148. For example, assume that the program controller 105 produces a conditional branch event signal, and the instruction cache 110 produces a cache miss event signal. Further assume that the shader designer is interested in situations where a conditional branch event occurs coincident with a cache miss event. Instead of configuring the first performance register 145 to count the occurrence of a first event signal (i.e., the conditional branch event signal) and the second performance register 146 to count the occurrence of a second event signal (i.e., the cache miss event signal), and then trying to examine and correlate the contents of both the first and second performance registers, the shader designer may configure the event logic block 135 using a software driver to perform a logical "and" of the first and second event signals. This logical "and" is defined as a "function," which then can be used to "trigger" a first performance register, meaning that the first performance register counts the occurrence of the function representing the logical and of the first and second event signals. In this manner, the event logic block 135 advantageously reduces the number of performance registers required to monitor two or more event signals and makes tracking complicated function more feasible. Referring again to the above example, if the first performance register counts the occurrence of the conditional branch event signal, and the second performance register counts the occurrence of the cache miss event signal, there may not be a straight-forward way to determine how many times these two event signals are coincident with one another since the performance registers also may count separate occurrences of these event signals. The ability to generate defined functions solves this problem. The structure of the even logic block 135 is described in greater detail below in conjunction with FIG. 3.

The performance registers 145, 146, 147 and 148 may be configured to count event signals occurring within one or more of the functional units. Each time an event signal occurs, the performance register is incremented. The shader designer examines the contents of the performance registers in order to better understand the processes within the different functional units 105, 110, 115, 10 and 125. In one embodiment, the contents of performance registers may be read directly a software driver. The software driver may also be configured to write a one or more of the performance registers to a specific value. In alternative embodiments, the shader unit 100 may be configured such that the contents of the performance registers affect the data within one or more of the execution pipes 130. For example, the execution pipes 130 may be configured to modify the red component of pixel data when the contents of one or more of the performance registers is greater than a predetermined threshold. In this manner, the shader designer can easily determine that the contents of the selected performance register(s) has reached or exceeded the threshold by simply monitoring the processed pixel data on a display device. In another embodiment, the contents of one or more of the performance registers may be read by programs executing within the shader unit 100, allowing the behavior of the programs to be modified by the contents of the performance registers. In yet another alternative embodiment, each performance register may be configured to have a carry out bit. The carry out bit may be monitored by another performance register, such as a performance register that is hierarchically positioned above the shader unit 100.

Each of the functional units 105, 110, 115, 120 and 125 includes a substantially similar internal structure for selecting and transmitting specified events to the event logic block 135. Therefore, only the internal structure of the program controller 105 is described in detail herein.

Figure 2:
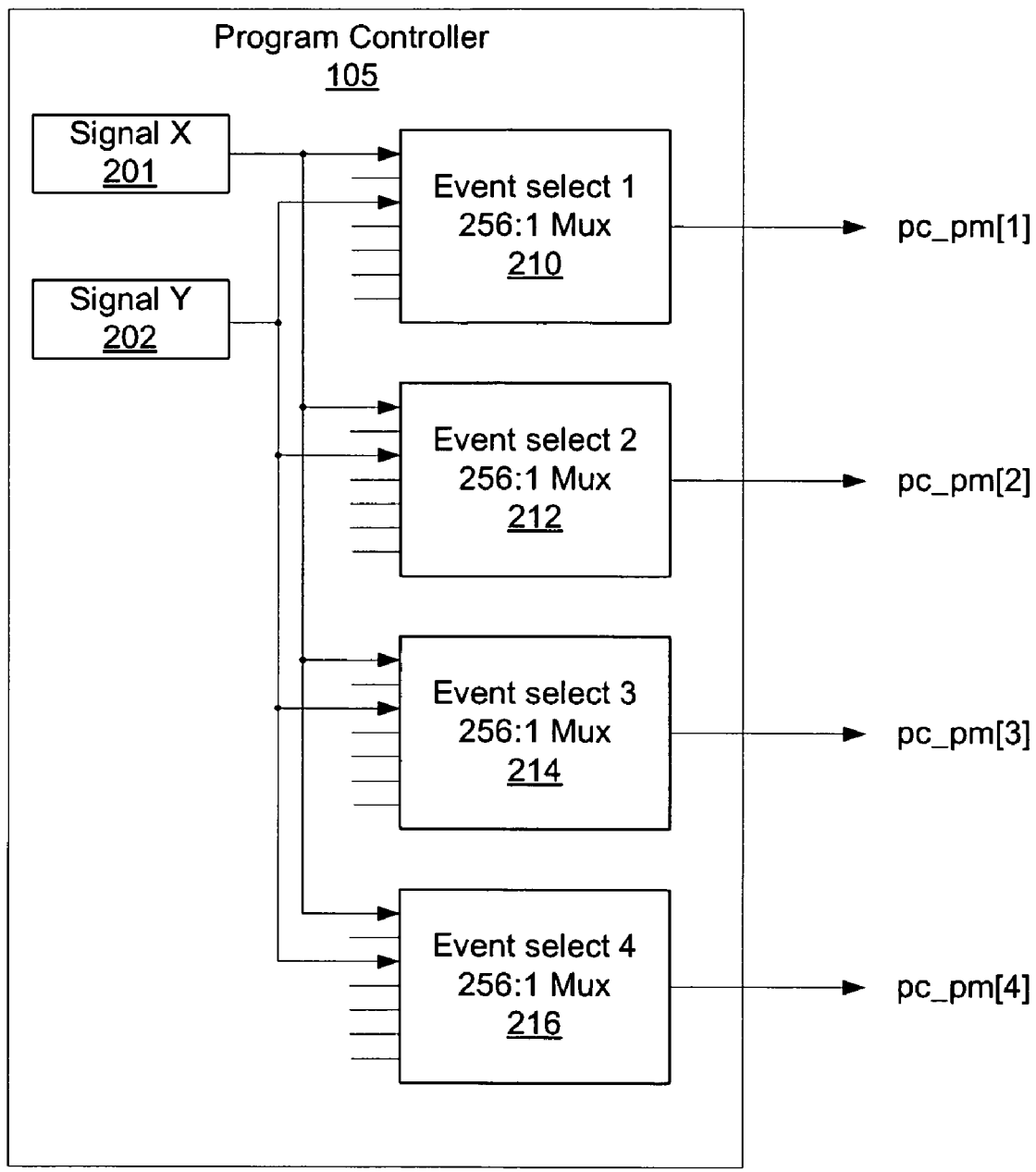
FIG. 2 is a conceptual diagram of the program controller of FIG. 1, according to one embodiment of the invention.

FIG. 2 is a conceptual diagram of the program controller 105 of FIG. 1, according to one embodiment of the invention. As shown, the program controller 105 includes, without limitation, four event multiplexers (muxes) 210, 212, 214 and 216. As previously described herein, an event may be any action of interest that occurs within a functional unit. Any one functional block may have several such events. Typical events within the program controller 105 include instruction fetches, conditional branches, call-return subroutines, and the like. Again, a given functional unit may include a relatively large number of events, and associated with each such event is an event signal. Two event signals generated within the program controller 105 are generically shown as a signal X 201 and a signal Y 202. A subset of the event signals generated within the program controller 105 may be selected through the event muxes 210, 212, 214 and 216, where each such mux is configured to select one event signal. The driver configures the event muxes 210, 212, 214 and 216 to select the event signals of interest. Thus, in this embodiment, a subset of four event signals is selected, and each selected event signal is transmitted to the event logic block 135. These event signals are denoted as pc_pm[1], pc_pm[2], pc_pm[3] and pc_pm[4]. Alternative embodiments of the program controller 105 and the other functional units described herein may include more or less than four event multiplexers.

Figure 3:
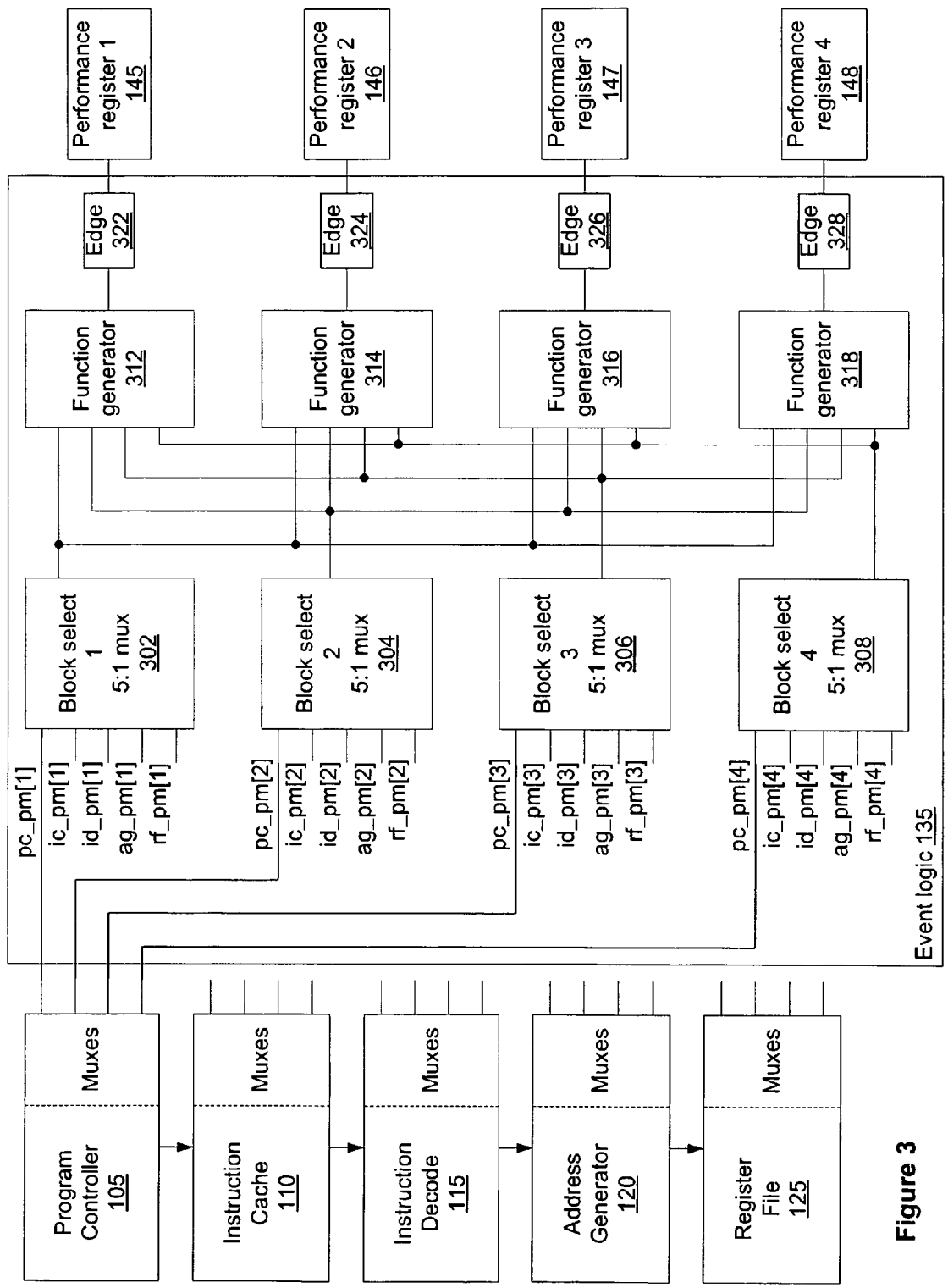
FIG. 3 is a more detailed illustration of the shader unit of FIG. 1, according to one embodiment of the invention.

FIG. 3 is a more detailed illustration of the shader unit 100 of FIG. 1, according to one embodiment of the invention. In this diagram, the functional units 105, 110, 115, 120 and 125 and the performance registers 145, 146, 147 and 148 are depicted in much the same manner as they were depicted in FIG. 1; however, the event signals selected and transmitted to the event logic block 135 are set forth in greater detail. Further, the execution pipes 130 have been omitted for clarity. The event logic block 135 includes, without limitation, a first block select mux 302, a second block select mux 304, a third block select mux 306, a fourth block select mux 308, a first function generator 312, a second function generator 314, a third function generator 316, a fourth function generator 318, a first edge selector 322, a second edge selector 324, a third edge selector 326 and a fourth edge selector 328. Alternative embodiments may include more or less than four function generators and four edge selectors.

As previously described herein, event signals selected by the muxes within the functional units 105, 110, 115, 120 and 125 are transmitted to the event logic block 135. As described in FIG. 2, in one embodiment, four selected event signals from each functional unit are transmitted to the event logic block 135. Thus, as shown in FIG. 3, each of the block select muxes 302, 304, 306 and 308 is configured to receive one event signal from each of the program controller 105, the instruction cache 110, the instruction decoder 115, the address generator 120 and the register file 125. Each block select mux, therefore, receives five event signals. For example, pc_pm[1] is transmitted from the program controller 105 to the first block select mux 302. Similarly, pc_pm[2] is transmitted from the program controller 105 to the second block select mux 304, pc_pm[3] is transmitted from the program controller 105 to the third block select mux 306 and pc_pm[4] is transmitted from the program controller 105 to the fourth block select mux 308. The other functional units 110, 115, 120 and 125 are similarly configured to transmit a different selected event signal to each of the block select muxes 302, 304, 306 and 308. The individual signal paths have been omitted from the figure for clarity, but the signal names are noted on the appropriate block select muxes 302, 304, 306 and 308, as the case may be. For example, ic_pm[1] is the first selected event signal from the instruction cache 110 and is shown as the second input to the first block select mux 302, and ag_pm[3] is the third selected event signal from the address generator 120 and is shown as the fourth input to the third block select mux 306.

Each of the block select muxes 302, 304, 306 and 308 is a five-to-one event signal mux that is configured by the driver to select one of the five event signals received from the functional units 105, 110, 115, 120 and 125 and to transmit the selected event signal to the function generators 312, 314, 316 and 318. As shown in FIG. 3, in one embodiment, the output of each block select mux 302, 304, 306 and 308 is transmitted to each of the function generators 312, 314, 316 and 318.

Each function generator 312, 314, 316 and 318 is configured by the driver to generate an "event function" based upon the four event signals received from the block select muxes 302, 304, 306 and 308. Each event function is a combination of one or more of those four event signals. In one embodiment, the function generator comprises a lookup table with sixteen entries, where each entry is a unique combination of the event signal states. Persons skilled in the art will recognize that such a lookup table may generate any event function representing any combination of the four event signals received by a particular function generator.

An edge selector is coupled to each function generator and is configured to receive the event function transmitted by the function generator. As shown, the first function generator 312 is coupled to the first edge selector 322, the second function generator 314 is coupled to the second edge selector 324, the third function generator 316 is coupled to the third edge selector 326 and the fourth function generator 318 is coupled to the fourth edge selector 328. A performance register is coupled to each edge selector and is configured to receive an edge signal transmitted by the edge selector. As shown, the first performance register 145 is coupled to the first edge selector 322, the second performance register 146 is coupled to the second edge selector 324, the third performance register 147 is coupled to the third edge selector 326 and the fourth performance register 148 is coupled to the fourth edge selector 328.

Upon receiving an event function from a function generator, the edge selector may be configured to pass the event function directly to the performance register or the edge selector may be configured to pass a logical true when the event function transitions and pass a logical false when the event function does not transition. In an alternative embodiment, the edge selector may determine the polarity of the edge of the event function that causes the performance register coupled to that edge selector to count. In other words, the edge selector selects either the rising or falling edge of the event function to trigger the performance register coupled to that edge selector. For example, the edge selector 322 may be configured to pass the event function received from the function generator 312 to trigger the first performance register 145, and the edge selector 324 may be configured to pass a logical true to trigger the second performance register 146 when the event function received from the function generator 314 transitions. Thus, the signals from the edge selectors 322, 324, 326 and 328 are used to trigger the performance registers 145, 146, 147 and 148, respectively, to count the occurrences of the event functions generated by the function generators 312, 314, 316 and 318, respectively.

In sum, the shader designer decides which events within the functional units 105, 110, 115, 120 and 125 to monitor and evaluate. Based on this information, the shader designer determines what event functions should be tracked. The function generators 312, 314, 316 and 318 are configured to generate the event functions the shader designer wants to track. The event muxes within the functional units 105, 110, 115, 120 and 125 and the block select muxes 302, 304, 306 and 308 are then configured to transmit the appropriate event signals to the to function generators 312, 314, 316 and 318, as the case may be, to generate the desired event functions.

In operation, the performance registers 145, 146, 147 and 148 coupled to the function generators 312, 314, 316 and 318, respectively, count the occurrences of the event functions the shader designer wants to track. Again, by examining the contents of the performance registers 145, 146, 147 and 148, the shader designer may gain insight into the processes that occur throughout the shader unit 100. This information may be useful in increasing the data throughput of the shader unit 100, or may also be helpful in developing and debugging shader programs in general.

Figure 4:
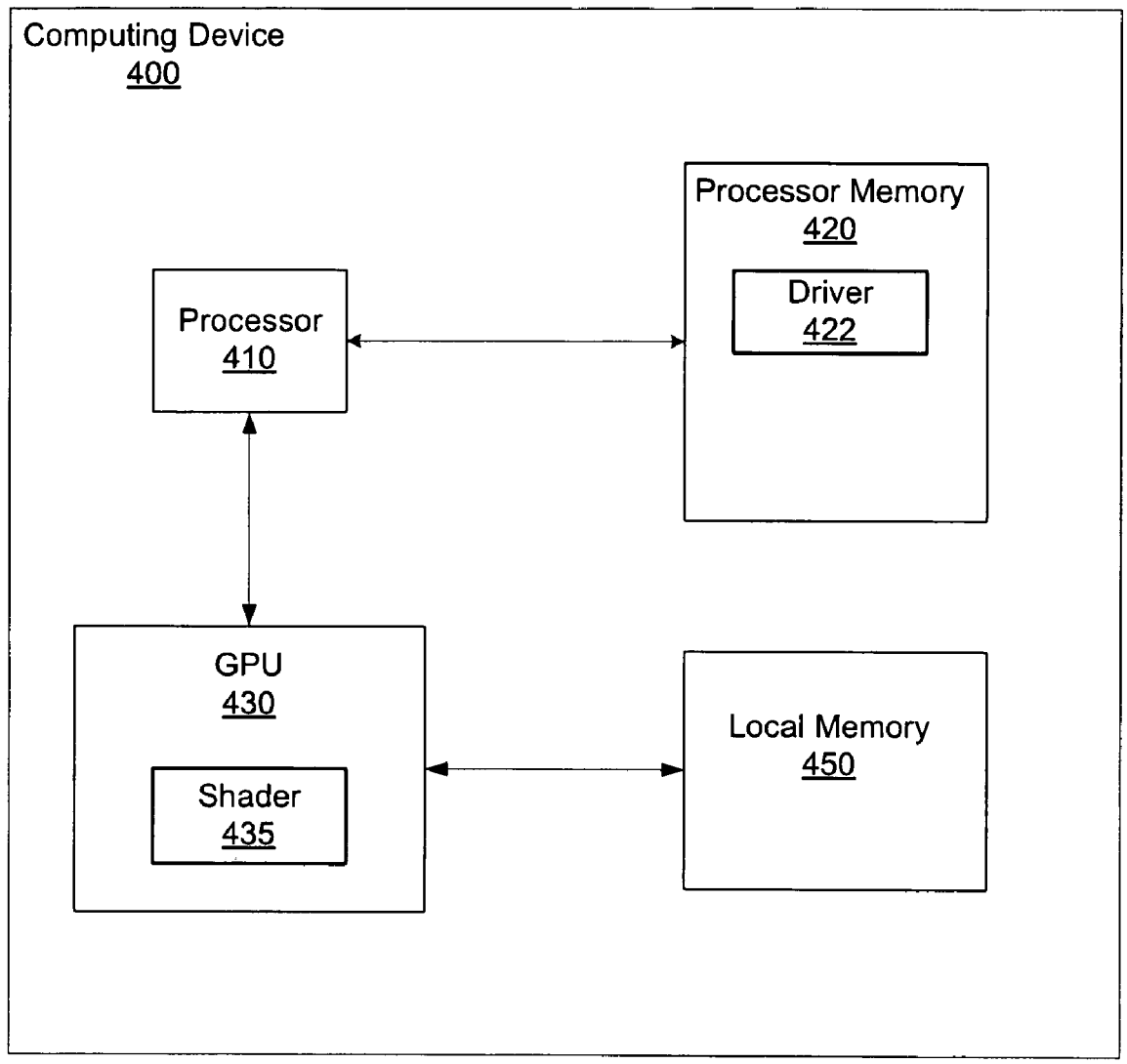
FIG. 4 is a conceptual diagram of a computing device in which one or more aspects of the aspects of the present invention may be implemented.

FIG. 4 is a conceptual diagram of a computing device 400 in which one or more aspects of the aspects of the present invention may be implemented. The computing device 400 includes, without limitation, a processor 410, processor memory 420, a graphics processing unit (GPU) 430 and local memory 450 for the GPU 430. The computing device 400 may be a desktop computer, server, laptop computer, palm-sized computer, personal digital assistant, tablet computer, game console, cellular telephone, or any other type of similar device that processes data. The processor 410 is coupled to the processor memory 420 used to store data and programs executed by the processor, such as a driver 422. The processor 410 is also coupled to the GPU 430. The GPU 430 includes at least one shader unit 435. Within the shader unit 435 are the functional units, the execution pipes, the event logic block and the performance registers, not shown, but described above in conjunction with FIGS. 1-3. The driver 422 may configure the GPU 430, and specifically the shader unit 435, by selecting events using the muxes in the functional units, by configuring the event logic block and execution pipes and by monitoring the data in the performance registers, as previously described herein. The processor 410 may also store instructions for the shader unit 435 in the local memory 450.

Figure 5:
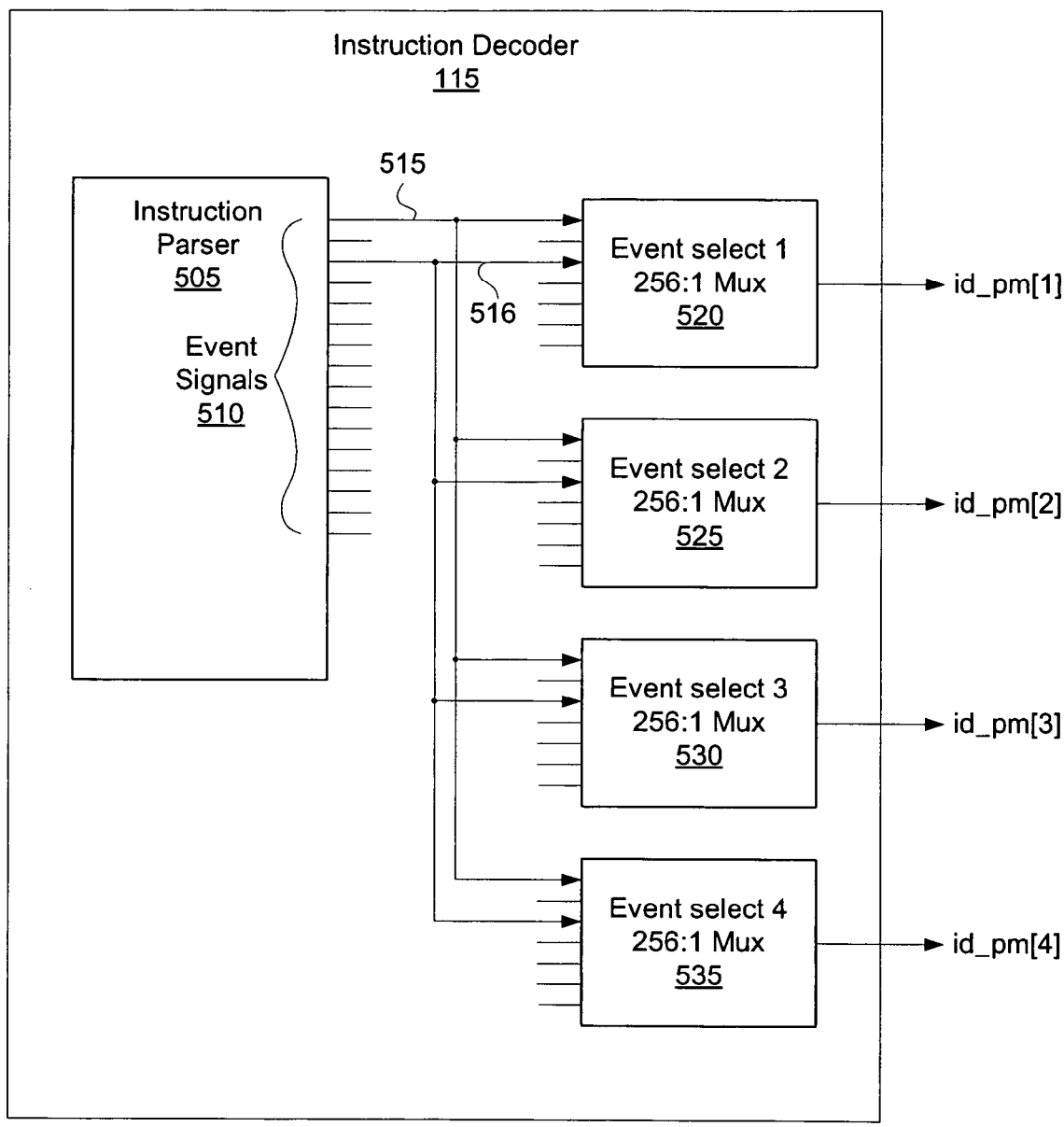
FIG. 5 is a conceptual diagram of the instruction decoder of FIG. 1, according to one embodiment of the invention.
Figure 6:
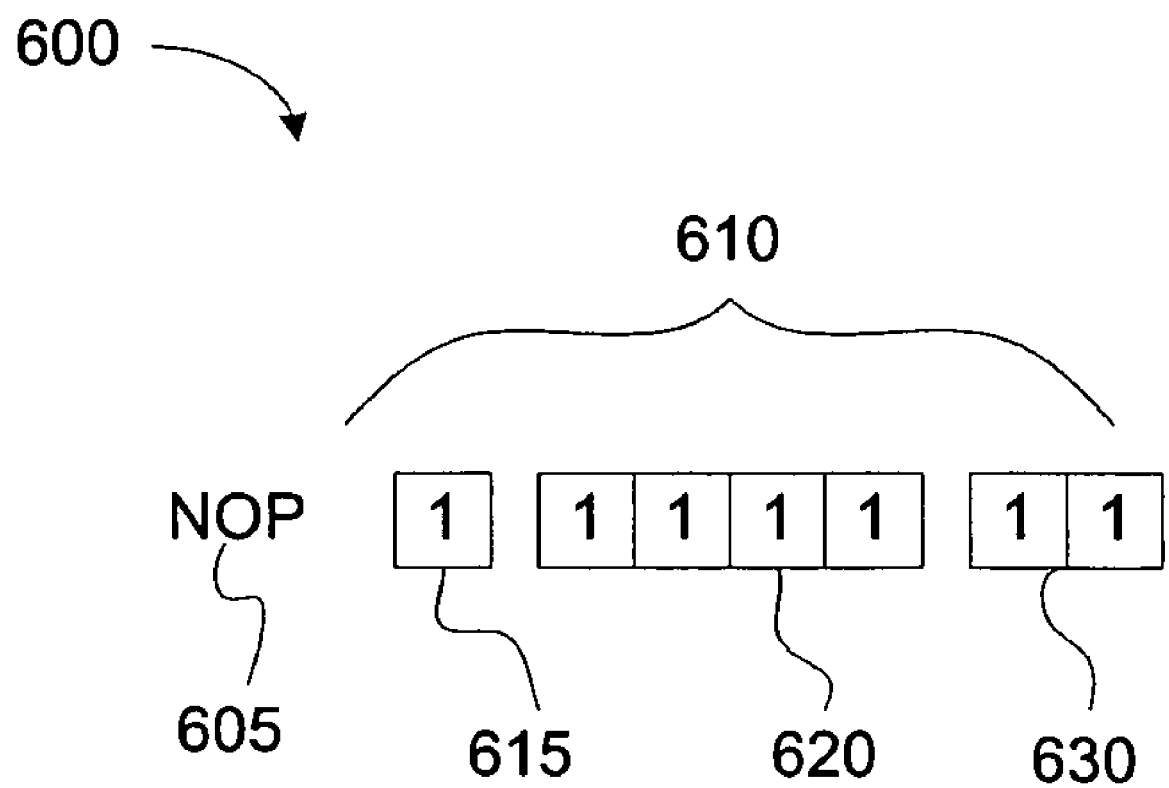
FIG. 6 is a conceptual diagram of a NOP instruction, according to one embodiment of the invention.

Using the approach set forth above, the instruction decoder 115 may be configured such that non-operative instructions can be used to trigger specific event signals within the instruction decoder 115. These event signals can then be transmitted to the event logic 135, as previously described herein. FIGS. 5 and 6 describe the specific configuration of the instruction decoder 115 and the corresponding use of the non-operative instructions.

FIG. 5 is a conceptual diagram of the instruction decoder 115 of FIG. 1, according to one embodiment of the invention. The instruction decoder 115 includes, without limitation, an instruction parser 505 and four event muxes 520, 525, 530 and 535. As previously described herein, the event muxes 520, 525, 530 and 535 may be configured by the driver to select a subset of the available event signals within the instruction decoder 115. Again, in this embodiment, a subset of four event signals are selected, and each selected event signal is transmitted to the event logic block 135. These event signals are denoted as id_pm[1], id_pm[2], id_pm[3] and id_pm[4]. Alternative embodiments of the instruction decoder 115 may include more of less than four event muxes.

As described in FIG. 3, the instruction decoder 115 may have a variety of event signals that can be monitored by performance registers 145, 146, 147 and 148 though function generators 312, 314, 316 and 318, respectively. These event signals may be triggered using non-operative (NOP) instructions included in the shader program. As described in greater detail below in conjunction with FIG. 6, a given NOP instruction may be specially configured to cause the instruction decoder 115 to generate a specific event signal. More specifically, as the instruction parser 505 parses the program instructions being executed within the shader unit 100, the instruction parser 505 is able to detect the presence of such a specially configured NOP instruction. The instruction parser 505 then generates the event signal that corresponds to the specific configuration of the NOP instruction. In one embodiment, there are sixteen different special NOP instruction configurations, allowing the instruction parser 505 to generate sixteen corresponding event signals 510. These sixteen event signals 510, along with the other event signals generated within the instruction decoder 115, are transmitted to the event muxes 520, 525, 530 and 535, where they may be selected for transmission to the event logic block 135. Two of the sixteen event signals generated by the instruction parser 505 are generically shown as event signals 515 and 516.

FIG. 6 is a conceptual diagram of a NOP instruction 600, according to one embodiment of the invention. The NOP instruction 600 includes, without limitation, an instruction identifier 605 and an operand 610. The instruction identifier 605 is used to uniquely identify the NOP instruction 600. The operand 610 includes a first bit field 615 and a second bit field 620. In alternative embodiments, the operand 610 may include more or less than two bit fields. The first bit field 615 indicates to the instruction parser 505 that the associated NOP instruction is supposed to trigger one of the sixteen possible event signals 510. In one embodiment, if no event signal is to be triggered by the NOP instruction, then the bit in the first bit field 615 is cleared to zero. If, on the other hand, an event signal is to be triggered by the NOP instruction, then the bit in the first bit field 615 is set to one. In the case where one of the sixteen event signals 510 is to be triggered, the second bit field 620 sets forth which particular event signal is to be triggered. In one embodiment, the second bit field 620 includes four bits that encode a binary representation of the particular event signal to be triggered. In other words, each of the sixteen possible binary representations corresponds to a specific event signal. In alternative embodiments, more or less than four bits may be used for the second bit field 620.

NOP instructions may be used in conjunction with the function generators 312, 314, 316 and 318 and the performance registers 145, 146, 147 and 148 to collect information about the types of program instructions being executed within the shader unit 100. For example, if a user wanted to better understand the execution profile of a portion of a shader program that included a conditional branch, the user may use the NOP instructions shown below in Table 1 to track how many times the conditional branch instructions are or are not executed.

TABLE 1

```
ADD R5, R4
IF (R5 > 1000) {
    THEN MOP 10001b
    MUL R6, R5
}
ELSE MOP 10010b
```

The first NOP instruction in the pseudo code, NOP 10001*b*, is executed each time the first condition for the conditional branch is satisfied and the associated instructions are executed. Thus, within the first NOP instruction, the first bit 615 (the first bit field) in the operand 610 is set so that the instruction parser 505 generates an event signal upon processing the first NOP instruction. The last four bits 620 (the second bit field) in the operand 610 are set to one so that the instruction parser 505 generates a first event signal specifically associated with that particular bit field pattern upon processing the first NOP instruction. In other words, the first event signal corresponds to a second bit field pattern of 0001. The second NOP instruction, NOP 10010*b*, is executed each time the first condition for the conditional branch is not satisfied. Again, the first bit 615 in the operand 610 is set so that the instruction parser 505 generates an event signal upon processing the second NOP instruction. The last four bits 620 in the operand 610 are set to two so that the instruction parser 505 generates a second event signal specifically associated with that particular bit field pattern upon processing the second NOP instruction. In other words, the second event signal corresponds to a second bit field pattern of 0010. Continuing with this example, the shader designer can determine the number of times the conditional branch is executed or not executed by configuring appropriate function generators 312, 314, 316 and 318 and performance registers 145, 146, 147 and 148 to count the occurrences of the first and second event signals. The resulting event signal counts may provide the shader designer with a better understanding of the behavior of the shader program.

In alternative embodiments, the execution of NOP instruction may be conditional, where the NOP instruction is executed only if a specified condition is satisfied. If the condition is satisfied, then the event signal associated with the NOP instruction is generated. If the condition is not satisfied, then the associated event signal is not generated. In one embodiment, the condition relates to a value stored in a conditional code register (not shown), which may be realized as a hardware register within the GPU 430 of FIG. 4. Some conditions of this type are whether the value of the conditional code register is less than zero, greater than zero or equal to zero. For example, consider a conditional NOP instruction that causes a first event signal to be generated only if the value of the conditional code register is greater than zero. If the value of the conditional code register is greater than zero, then the NOP instruction is executed, and the first event signal is produced. If, on the other hand, the value of the conditional code register is not greater than zero, then the NOP signal is not executed, and the first event signal is not produced.

Referring again to FIG. 6, the NOP instruction 600 may include a third bit field 630 that indicates to the instruction parser 505 that the NOP instruction 600 is a conditionally executed instruction. In one embodiment, the value of the third bit field 630 encodes the condition that needs to be satisfied before the NOP instruction 600 is executed. For example, if the value of the third bit field 630 is one, then the NOP instruction 600 is executed only when the value of the condition code register is greater then zero. If the value of the third bit field 630 is two, then the NOP instruction 600 is executed only when the value of the condition code register is less than zero. If the value of the third bit field 630 is three, then the NOP instruction 600 is executed only when the value of the condition code register is equal to zero. Finally, if the value of the third bit field 630 is zero, then the NOP instruction is not conditionally executed; rather, the NOP instruction 600 is always executed.

An advantage of making the execution of NOP instructions conditional, as described herein, is that as few as two instructions may be used to conditionally produce an event signal—a first instruction to write the condition code register and a second instruction to generate the event signal. As persons skilled in the art will recognize, without such conditional NOP instructions, additional conditional branch instructions would have to be used to jump around a specific NOP instruction to conditionally produce an event signal.

As the foregoing example illustrates, the shader designer can use the NOP instructions embedded in the shader program code to control the types of event signals generated within the instruction decoder 115. Further, the shader designer can track the occurrences of these event signals using the function generators 312, 314, 316 and 318 and performance registers 145, 146, 147 and 148. Again, the shader designer can use the resulting count information to observe the performance of the shader program and to optimize the shader program design.

While the foregoing is directed to embodiments of the present invention, other and further embodiments of the invention may be devised without departing from the basic scope thereof. For example, although the present invention has been described in the context of shader units within a graphics processing unit, persons skilled in the art will appreciate that aspects of the present invention may be implemented in general purpose processing units as well. Thus, the scope of the invention is determined by the claims that follow.

We claim:

1. An instruction decoder included within a graphics shader, the instruction decoder configured to generate event signals based on specially configured instructions, each of the specially configured instructions being inserted into the sequence of instructions running on the graphics shader and identifying one of a plurality of events caused by the execution of an instruction in the sequence in the graphics shader, and that does not affect a sequence of instructions running on the graphics shader, the instruction decoder comprising:

an instruction parser configured to process a first one of the specially configured instructions and to generate a first event signal corresponding to the execution of an instruction in the graphics shader, wherein each one of the specially configured instructions is specified using an identifier of a non-operative (NOP) instruction, a first bit field indicating that one of the plurality of events will be triggered, and a second bit field identifying the one of the plurality of events;

a first event multiplexer configured to receive the first event signal from the instruction parser, to select the first event signal from one or more event signals based on the second bit field and to transmit the first event signal to an event logic block for recording an event occurring in a functional unit of the graphics shader, wherein the first event multiplexer is configured by a software driver to select the first event signal from the one or more event signals based on the second bit field; and a performance register that is configured to perform the recording of the event, and wherein the graphics shader is configured to modify behavior of a program executed by the graphics shader based on contents of the performance register and modify a color comment of pixel data stored in the memory when contents of the performance register is greater than a threshold.

2. The instruction decoder of claim 1, wherein the instruction parser is configured to determine the value of the second bit field, and thereby identify a condition relating to a value stored in a register in the graphics shader, and to generate an event signal if the condition is satisfied.

3. The instruction decoder of claim 1, wherein the second bit field of the first specially configured instruction has a first value, and the first event signal generated by the instruction parser corresponds to the first value.

4. The instruction decoder of claim 1, wherein the second bit field comprises four bits.

5. The instruction decoder of claim 1, wherein the instruction parser is configured to determine whether to generate the first event signal based on the value of a third bit field that encodes a condition.

6. The instruction decoder of claim 1, wherein the first bit field comprises a single bit, and the instruction parser is configured to generate the first event signal if the single bit is set.

7. The instruction decoder of claim 1, further comprising a second event multiplexer, a third event multiplexer and a fourth event multiplexer, wherein each of the second, third and fourth multiplexers is configured to receive the first event signal from the instruction parser.

8. A computing device configured for observing event occurrences within a graphics shader in response to a sequence of instructions, the computing device comprising:

a memory that stores a software driver; and an instruction decoder included within the graphics shader, wherein the instruction decoder is configured to decode specially configured instructions inserted into the sequence of instructions running on the graphics shader and identify one of a plurality of events caused by execution in the graphics shader of an instruction in the sequence in the graphics shader, and that does not affect a sequence of instructions running on the graphics shader comprising:

an instruction parser configured to process a first one of the specially configured instructions and to generate a first event signal corresponding to the execution of the instruction in the sequence in the graphics shader, wherein each one of the specially configured instructions is specified using an identifier of a non-operative (NOP) instruction, a first bit field indicating that one of the plurality of events will be triggered, and a second bit field identifying the one of the plurality of events, a first event multiplexer configured to receive the first event signal from the instruction parser, to select the first event signal from one or more event signals and to transmit the first event signal to an event logic block for recording an event occurring in a functional unit of the graphics shader, wherein the first event multiplexer is configured by the software driver to select the first event signal from the one or more event signals, and a performance register that is configured to perform the recording of the event, and wherein the graphics shader is configured to modify behavior of a program executed by the graphics shader based on contents of the performance register and modify a color component of pixel data stored in the memory when contents of the performance register is greater than a threshold.

9. The computing device of claim 8, wherein the first specially configured instruction includes a third bit field that identifies a condition relating to a value stored in a register in the graphics shader, and the instruction parser is configured to determine the value of the third bit field and to generate an event signal if the condition is satisfied.

10. The computing device of claim 9, wherein the second bit field of the first specially configured instruction has a first value, and the first event signal generated by the instruction parser corresponds to the first value.

11. The computing device of claim 9, wherein the second bit field comprises four bits.

12. The computing device of claim 9, wherein the first specially configured instruction includes a second bit field, and the instruction parser is configured to determine whether to generate the first event signal based on the value of the second bit field.

13. The computing device of claim 12, wherein the first bit field comprises a single bit, and the instruction parser is configured to generate the first event signal if the single bit is set.

14. The computing device of claim 8, further comprising a second event multiplexer, a third event multiplexer and a fourth event multiplexer, wherein each of the second, third and fourth multiplexers is configured to receive the first event signal from the instruction parser.

15. The instruction decoder of claim 1, wherein the event logic block is configured by the software driver to combine the first event signal and a second event signal according to an occurrence of a function for counting occurrences of the event.

16. The computing device of claim 8, wherein the event logic block is configured by the software driver to combine the first event signal and a second event signal according to an occurrence of a function for counting occurrences of the event.

17. A computing device configured for observing event occurrences within a graphics shader in response to a sequence of instructions, the computing device comprising:

an instruction decoder included within the graphics shader, wherein the instruction decoder is configured to decode an opcode of each instruction in the sequence of instructions;

determine that an opcode of a specially configured instruction inserted into the sequence of instructions is a non-operative instruction opcode;

decode a first field of the specially configured instruction;

determine that the first field indicates that one of a plurality of events caused by execution in the graphics shader of the sequence in the graphics shader, and that does not affect the sequence of instructions running on the graphics shader is triggered;

decoding a second field of the specially configured instruction to identify the one of the plurality of events, and generating a first event signal to select the first event signal from one or more event signals and to transmit the first event signal to an event logic block for recording an event occurring in a functional unit of the graphics shader, wherein a performance register is configured to perform the recording of the event and wherein the graphics shader is configured to modify behavior of a program executed by the graphics shader based on contents of the performance register and modify a color component of pixel data stored in the memory when the contents of the performance register is greater than a threshold.

18. The computing device of claim 17, wherein the instruction decoder is further configured to decode a third field of the specially configured instruction, the third field encoding a condition that controls whether or not the specially configured instruction is executed.

* * * * *

UNITED STATES PATENT AND TRADEMARK OFFICE
CERTIFICATE OF CORRECTION

| | | |
|---|---|---|
| PATENT NO. | : 7,809,928 B1 | Page 1 of 1 |
| APPLICATION NO. | : 11/313872 | |
| DATED | : October 5, 2010 | |
| INVENTOR(S) | : Allen et al. | |

It is certified that error appears in the above-identified patent and that said Letters Patent is hereby corrected as shown below:

Column 10, line 44, Claim 1, please replace "comment" with --component--.

Signed and Sealed this
Twenty-ninth Day of March, 2011

David J. Kappos
*Director of the United States Patent and Trademark Office*